United States Patent [19]
Shteynberg et al.

[11] Patent Number: 5,939,670
[45] Date of Patent: Aug. 17, 1999

[54] TRIM STRUCTURE FOR SAFETYMAT

[75] Inventors: Boris Shteynberg, San Francisco, Calif.; Brian Sukarukoff, Gross Pointe Farms, Mich.

[73] Assignee: Scientific Technologies Incorporated, Fremont, Calif.

[21] Appl. No.: 08/965,388

[22] Filed: Nov. 6, 1997

[51] Int. Cl.$^6$ .................................. H02G 3/04; H02G 3/10
[52] U.S. Cl. .................... 174/49; 52/718.04; 439/209; 439/925
[58] Field of Search .................... 174/48, 49, 66; 220/241, 3.8; 439/207, 209, 925; 52/716.1, 716.4, 716.8, 718.04, 220.1

[56] References Cited

U.S. PATENT DOCUMENTS

| | | | |
|---|---|---|---|
| 3,118,017 | 1/1964 | Wimbish | 174/49 X |
| 3,786,171 | 1/1974 | Shira | 174/48 |
| 4,037,900 | 7/1977 | Schmidger | 174/48 X |
| 5,406,762 | 4/1995 | Buard | 174/48 X |
| 5,694,726 | 12/1997 | Wu | 52/718.04 |
| 5,706,623 | 1/1998 | Brown | 52/718.04 |

FOREIGN PATENT DOCUMENTS 365522  12/1962  Switzerland ...................... 174/66 X

*Primary Examiner*—Dean A. Reichard
*Attorney, Agent, or Firm*—Flehr Hohbach Test Albritton & Herbert LLP

[57] ABSTRACT

A trim structure for use with safetymats. The trim structure is of two-part construction and includes a rigid base which is fastened to a floor together with a cover formed of a resilient material. The top wall of the cover and the bottom wall of the base carry interlock structures which include releasable engagement members. In an assembled mode, the engagement members function to hold the cover on the base. The top wall is separated from the bottom wall to form a wireguide through which the cables or wires leading from the safetymat can be threaded. The trim structure can be easily disassembled by pulling the cover from the base to cause the engagement members to disengage.

6 Claims, 3 Drawing Sheets

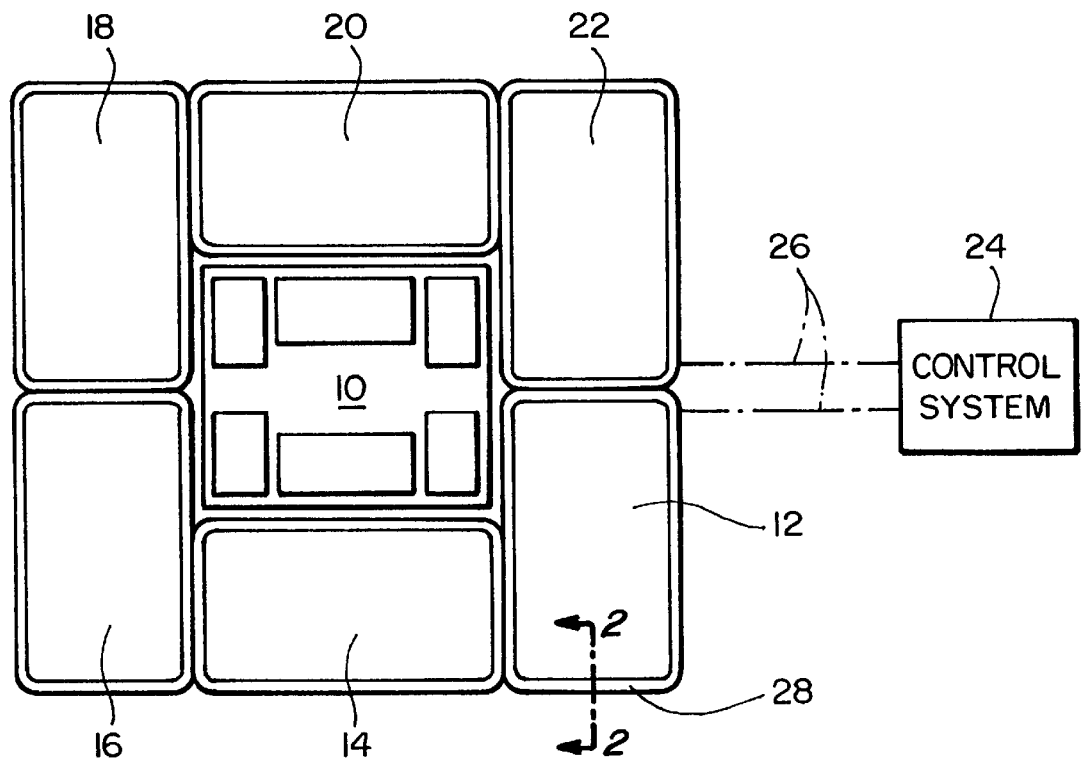
FIG_1
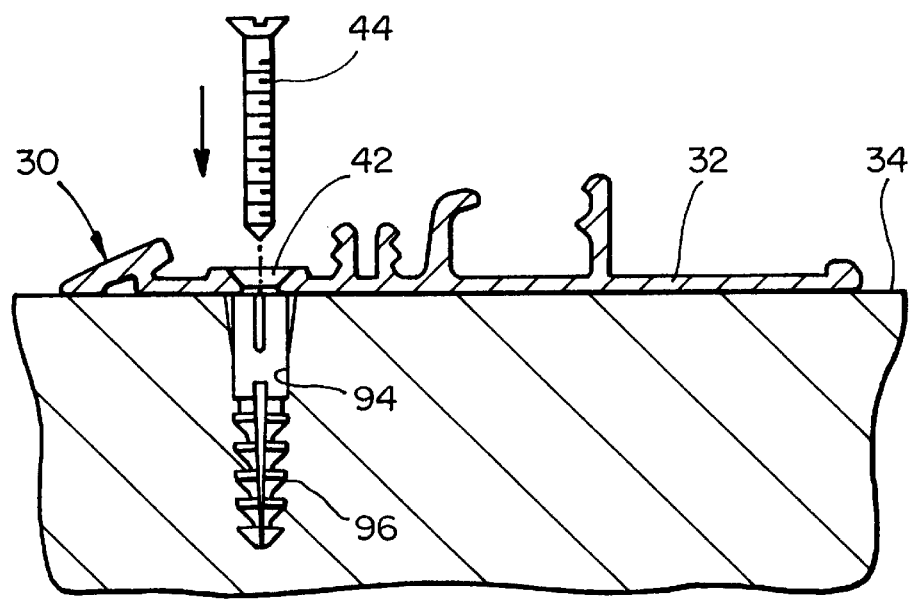
FIG_3

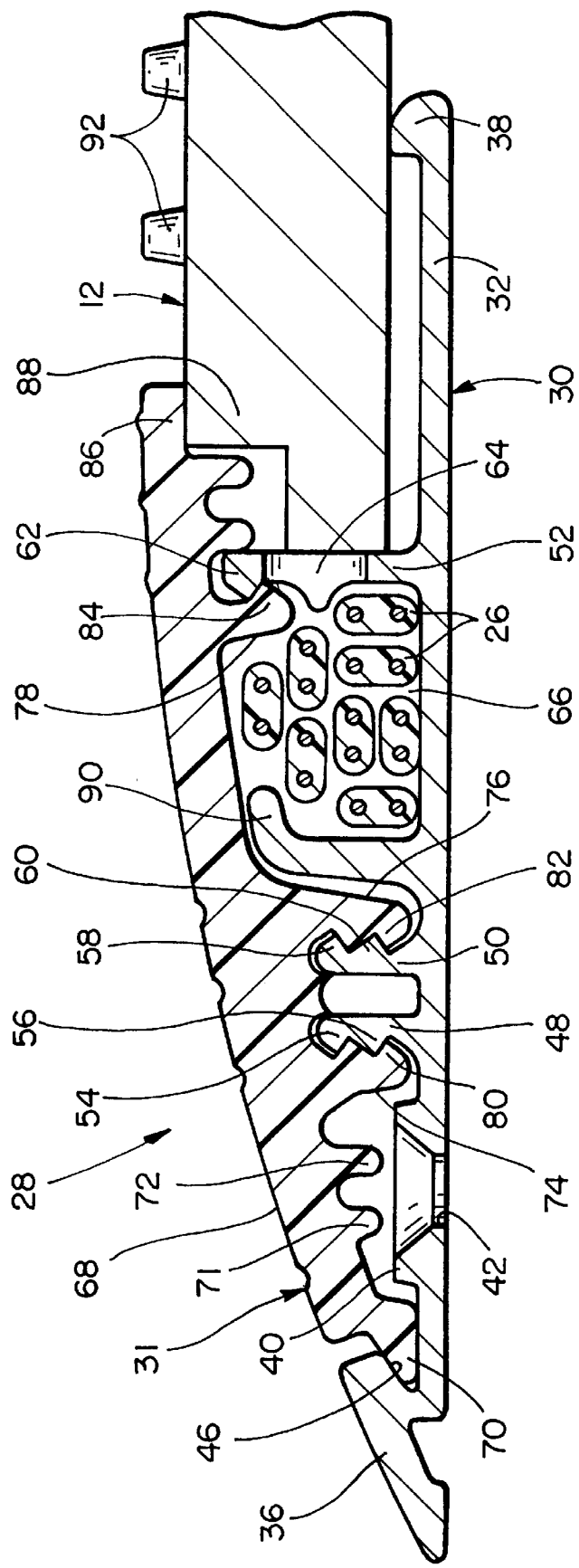
FIG_2

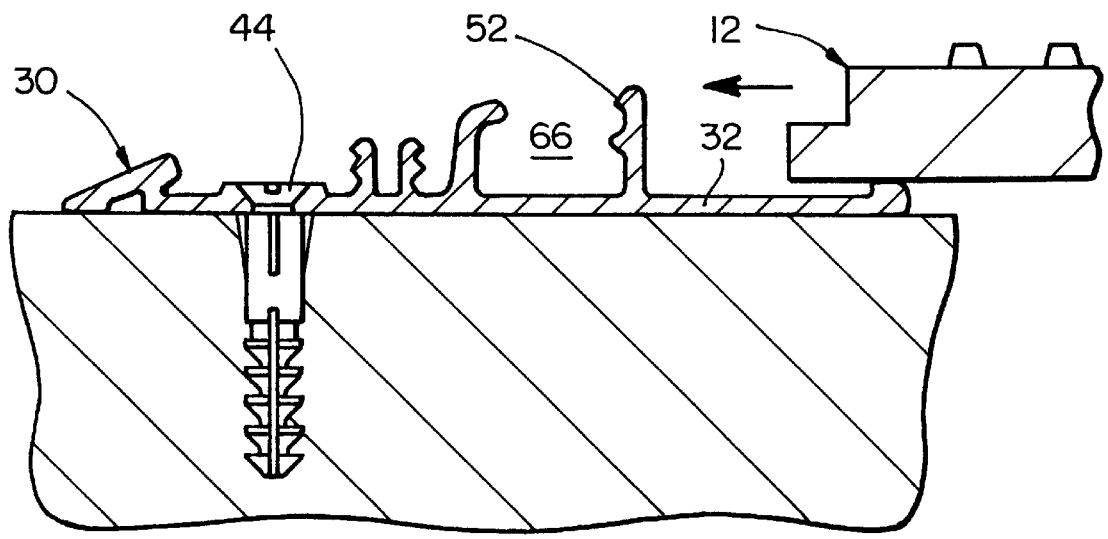
FIG_4
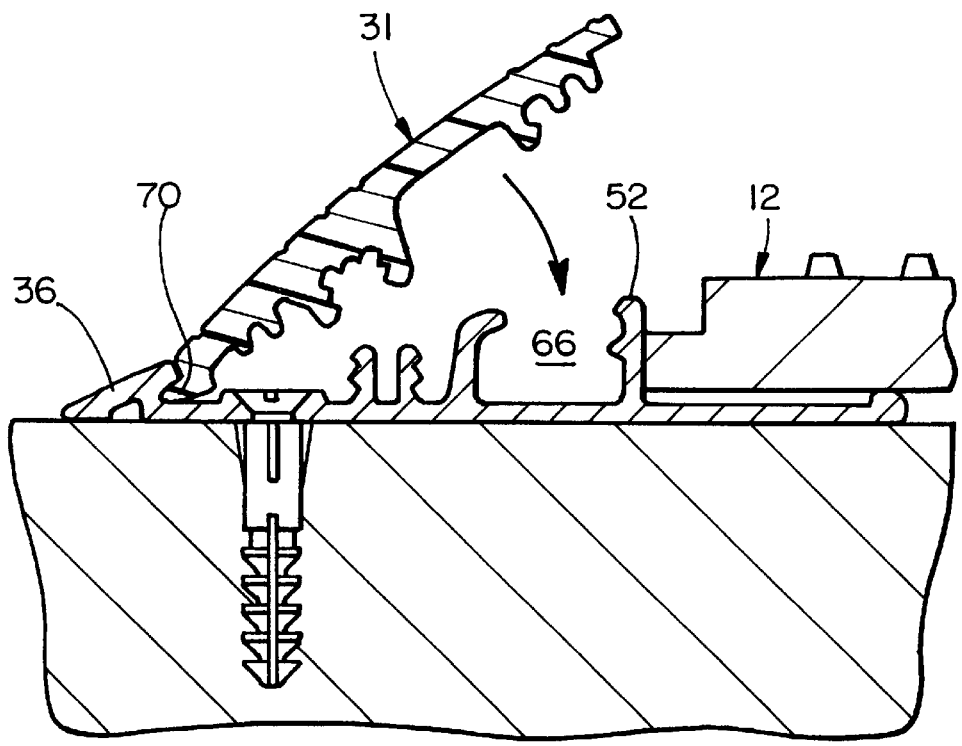
FIG_5

TRIM STRUCTURE FOR SAFETYMAT

BACKGROUND OF THE INVENTION

1. Field of the Invention

This invention relates in general to safetymats of the type used for workers to stand on during industrial activities. More particularly, the invention relates to trim structures for fitting about the outer perimeters of such safetymats.

2. Description of the Related Art

Safetymats are commonly used in various industries for workers to stand on when performing job activities. Typically the safetymats are connected by electrical cables or wires to a control system which senses when the workers are standing or treading on the mats at their work stations. The control system can be programmed to process the control signals from the safetymats for different purposes. These include worker safety as well as quality control for the manufactured product.

Industries such as automobile manufacturing have used safetymats for quality control at different types of work stations. In certain cases each work station involves teams of workers organized into separate work cells. The teams of the different work cells are required to move to and from their assigned stations around an assembly area or other manufacturing activity. A plurality of safetymats are provided for the workers in the cells to stand on when at their stations. One way the control system maintains quality control is by analyzing control signals from the safetymats to ensure that each team of workers are at their proper stations at the correct time during the assembly or other manufacturing operation. For example, a safetymat would be used in front of a parts supply bin so that the control system could monitor whether a worker has stepped on the mat to obtain the correct part during a particular phase of the assembly procedure.

The prior art safetymats have typically been installed by first laying the mat on the floor and then routing the control cables or wires along a perimeter edge of the mat and then to the control system. At each perimeter edge a strip of single-piece trim would then be placed along the perimeter of the mat, holding the control cables or wires in place. Holes would then be drilled through the trim with fastener screws then used to secure the trim, and thereby the mat, to the floor. A tape of the desired coded color, such as yellow, would then be adhered to the top surfaces of the trim.

One disadvantage in the prior art safetymats is where the mat fails, such as breakage of a part or short circuit in the wiring, and therefore must be replaced. Safetymat replacement is a time consuming, and therefore costly, procedure in that it involves removing the trim and defective mat, placing a new mat down, fitting a one-piece trim along each edge and then routing the control cable or wire around the trim.

The need has therefore been recognized for a safetymat trim structure which obviates the foregoing and other limitations and disadvantages of the prior art safetymats. Despite the various safetymats in the prior art, there has heretofore not been provided a suitable and attractive solution to these problems.

OBJECTS AND SUMMARY OF THE INVENTION

It is generally object of the present invention to provide a new and improved trim structure for a safetymat.

Another object is to provide a trim structure for a safetymat which can be easily and rapidly assembled, and which can also be easily and rapidly disassembled for replacement of a failed mat.

Another object is to provide a trim structure of the type described which is of a two-piece construction having a rigid base which can be fixedly secured to a floor together with a cover which is adapted for easily assembly on and disassembly from the base.

Another object is to provide a trim structure of the type described in which control cables or wires for a safetymat are routed along a channel within the trim structure.

The invention in summary provides a safetymat trim structure having a base for overlying a floor and a cover which releasably mounts on top of the base. In an assembled mode of the structure, an interlock structure on a bottom wall of the base releasably engages an interlock structure carried below the top wall of the cover. In this mode portions of the top and bottom walls are separated by a gap which is sufficiently large to enclose at least one control cable or wire leading from the safetymat to a control system. In a disassembled mode, the engagement members are released to enable the cover to separate from the base. The cables or wires can then be installed, removed or replaced.

The foregoing and additional objects and features of the invention will appear from the following description of the invention taken in conjunction with the accompanying drawings.

BRIEF DESCRIPTION OF THE DRAWINGS

FIG. 1 is a top plan view illustrating a typical industrial work station at which a plurality of safetymats incorporating the invention are shown clustered around the work station.

FIG. 2 is a fragmentary vertical cross sectional view to an enlarged scale taken along the line 2—2 of FIG. 1.

FIG. 3 is a vertical cross section view similar to FIG. 2 showing a component of the trim structure of the invention in an initial step of the installation procedure of a safetymat.

FIG. 4 is a view similar to FIG. 3 illustrating a further step in the installation procedure of the safetymat.

FIG. 5 is a view similar to FIG. 4 illustrating a still further step in the installation procedure of the safetymat.

DESCRIPTION OF THE PREFERRED EMBODIMENTS

In the drawings FIG. 1 illustrates generally at 10 a typical industrial work station about which are clustered a plurality, shown as six, of safetymats 12–22. The safetymats are of the type which sense when workers are standing or treading on the mats. A control system 24, which can be of conventional design, is provided for receiving electrical control signals from cables or wires 26 leading from the mats. The control system would be programmed to process the signals in the manner required for the particular job application. An example would be that of quality control to ensure that a worker, or a team of workers, are on a particular mat when they are required to be there to perform their tasks in the proper sequence.

A trim structure 28 fitted about the outer perimeter of safetymat 12 is typical of the six mats and is shown in detail in FIGS. 2–6. The trim structure is of two-piece construction and is comprised of a base 30 and cover 31. The base is formed with a flat bottom wall 32 which can be mounted over a floor 34 or other support (FIG. 3). The base can be advantageously made by an extrusion process, and is formed of a material having sufficient rigidity to hold the safetymat against displacement when assembled and fastened to the floor. Aluminum as the material for the base is suitable for this purpose. The base is formed on one side with an outer toe portion 36 and on its opposite side with an inner upstanding rib 38 upon which the outer perimeter of safetymat 12 rests. Preferably the width between the outer toe portion and inner rib 38 is on the order of 3.6". The base can be extruded into 20' long sections which can then be cut to the length required to fit the particular side of a safetymat.

An upstanding rib 40 is formed along the upper side of base bottom wall 32. A series of countersunk openings 42 are drilled down from the top of this rib for purposes of receiving a fastener screw 44, as explained below in relation to FIGS. 3 and 4.

The top side of base bottom wall 32 is formed with an inwardly concave, V-shaped slot 46 which runs the length of and is positioned inwardly of toe portion 36. An interlock structure is formed integral with the bottom wall and comprises an outer releasable engagement member 48, middle releasable engagement member 50 and inner releasable engagement member 52. Outer member 48 is in the form of an upstanding rib which extends the length of the base and is formed with a pair of outwardly projecting V-shaped catches 54, 56. Middle member 50 is also in the form of an upstanding rib which extends lengthwise of the base and has a pair of inwardly projecting V-shaped catches 58, 60. Inner member 52 is also in the form of an upstanding rib which extends lengthwise of the base and has an outwardly projecting V-shaped catch 62 at the rib's distal end. One or more openings 64 are formed through inner member 52 at the appropriate locations for threading the control cables or wires 26 which lead from safetymat 28. A gap or wireway 66 is formed between the top and bottom walls on the outer side of member 52 for holding the wires.

Cover 31 preferably is made by an extrusion process from a material which is sufficiently resilient to enable it to engage with and disengage from base through the manual application of force. A material suitable for this purpose is polyvinyl chloride (PVC). The cover is comprised of a top wall 68 having an outer edge portion which is formed with an outwardly directed V-shaped projection 70, which extends the length of the cover. This projection is sized and proportioned for interfitting with slot 46 at the toe portion of the base.

The top wall of the cover is also formed with a pair of downwardly depending ribs 70, 72 which, when unweighted, are spaced above the heads of the fastening screws which fit within openings 42. When depressed down from the weight of a worker on the trim structure, the two ribs move into contact with the screw heads and rib 40 to limit downward movement of the outer portion of the cover.

Cover 31 includes an interlock structure which is comprised of an outer releasable engagement member 74, a central releasable engagement member 76, and an inner releasable engagement member 78. Outer member 74 is comprised of a downwardly extending web which runs the length of the cover. This web is formed with a pair of inwardlydirected V-shaped detents 80 which are sized and shaped commensurate with the corresponding surfaces of catches 54, 56 on outer web 48 of the base.

When the cover is pressed down against the base, the inclined surface at the bottom of lowermost detent 80 cams against the inclined surface of the uppermost catch 54 on the base. This bends cover member 74 outwardly so that the detents are enabled to snap back and engage with the catches due to the elastic memory of member 74. The resulting engagement is releasable in that an upward pulling force on the cover causes the upper faces of the detents to cam against the lower faces of the catches, thereby bending the member 74 outwardly sufficient to enable release of the detents. Central web 76 member is formed with a pair of outwardly projecting, V-shaped detents 82 which are sized and shaped for similar engagement with and disengagement from the catches 58, 60 of base central web member 50. Inner web member 78 depends down from the upper wall is formed with an inwardly directed detent 84 which is sized and shaped for similar engagement with and disengagement from catch 62 of base inner web member 52.

The top wall 68 of the cover is formed with an inner margin 86 which extends in overlapping relationship with perimeter edge 88 of the mat. The amount of overlap is sufficient to hold the perimeter edge against vertical movement when the cover and base are assembled together in the manner shown in FIG. 2.

Base 30 is further formed with an L-shaped web 90 which extends upwardly from bottom wall 32. When the cover is weighted, such as from a worker standing on the trim, the rounded end of web 90 limits downward displacement of top wall 68 to preserve the gap or wireway 66 between the top and bottom walls through which the control wires extend. The upper end of inner web member 52 also provides similar support for this purpose.

Mat 12 can be of the conventional type which includes spaced-apart electrodes, not shown, which are encapsulated within the mat below its upper surface. The base inner rib 38 is spaced sufficiently from the outer edge of the mat that it serves as a fulcrum about which the mat's outer perimeter bends down when a worker stands or treads on traction cleats 92. This bending action causes the spaced electrodes running along the perimeter to come into contact. This closes an electric circuit through one of the wires leading through wireway 66 to the control system.

FIGS. 3–5 illustrate a method of installing the trim structure of the invention with a safetymat. Holes 94 are first drilled in the floor 34 at the appropriate locations which correspond to openings 42 in base bottom wall 32. As required, screw anchors 96 can be installed in these holes. Base 30 is then laid down with its bottom wall flush against the floor, and fastening screws 44 are turned down into the anchors to secure the base as shown in FIG. 3.

In the next step of FIG. 4, the safetymat 12 is laid down and moved toward the base until the mat's outer perimeter is flush with base inner web member 52, as shown in FIG. 5. The control wires from the mat are then threaded through opening 10 in this web member (FIG. 2), along wireguide 66 within the base and out to the control system. Cover 31 is then installed by placing its V-shaped projection 70 into the slot of base toe portion 36. The cover then is manually pressed down until the locking members snap together and interengage in the position shown in FIG. 2. In this position, the inner margin of the cover top wall holds the outer perimeter of the mat in place.

The trim structure of the invention can be easily disassembled, such as for purposes of repairing or replacing a defective or failed mat. The cover is manually pivoted upwardly with sufficient force to cause the locking members to snap out of engagement with the corresponding catches on the base web members. The wires can then be easily removed from the wire guide while the mat is removed and replaced. The cover can then be snapped back onto the base. It has been found that the time required to replace a failed mat in this manner is only approximately 20% of the time required using prior installation methods.

Another advantage in the invention is that the trim covers can be quickly removed to enable replacement with covers of selected coloration which is coded for a particular job activity. The workers would be trained to recognize the color-coded mats as an aid to increasing their efficiency as well as for quality control.

While the foregoing embodiments are at present considered to be preferred it is understood that numerous variations and modifications may be made therein by those skilled in the art and it is intended to cover in the appended claims all such variations and modifications as fall within the true spirit and scope of the invention.

What is claimed is:

1. A trim structure fitting about an outer perimeter of a safetymat which is controlled, operated or powered by one or more cables or wires, the trim structure comprising the combination of a base having a bottom wall for overlying a support and a first interlock structure carried above the bottom wall, a cover having a top wall and a second interlock structure carried below the top wall, the first and second interlock structures having respective first and second complementary releasable engagement members which engage together in an assembled mode and disengage apart in a disassembled mode, the top wall being mounted on the bottom wall with the first and second releasable engagement members being engaged together in the assembled mode, a portion of the top wall being separated by a gap from a portion of the bottom wall in the assembled mode with the gap being sufficiently large to enable the enclosure within the gap of at least one of the cables or wires, the engagement members in the disassembled mode enabling the cover to be dismounted from the bottom wall with the gap being exposed for installation, removal or replacement of the cables or wires, the outer perimeter of the safetymat has an upper edge, the trim structure further being characterized in that the cover has an outer edge portion together with an inner margin which is adjacent the upper edge of the safetymat in the assembled mode and a top surface which tapers upwardly from the outer edge portion to the inner margin, the base comprises an outer toe portion having an inwardly concaval slot, and the cover comprises said outer edge portion having a projection which is directed outwardly, said projection nesting into the concaval slot for enabling the cover to pivot relative to the base between the disassembled and assembled modes.

2. A trim structure fitting about an outer perimeter of a safetymat which is controlled, operated or powered by one or more cables or wires, the trim structure comprising the combination of a base having a bottom wall for overlying a support and a first interlock structure carried above the bottom wall, a cover having a top wall and a second interlock structure carried below the top wall, the first and second interlock structures having respective first and second complementary releasable engagement members which engage together in an assembled mode and disengage apart in a disassembled mode, the top wall being mounted on the bottom wall with the first and second releasable engagement members being engaged together in the assembled mode, a portion of the top wall being separated by a gap from a portion of the bottom wall in the assembled mode with the gap being sufficiently large to enable the enclosure within the gap of at least one of the cables or wires, the engagement members in the disassembled mode enabling the cover to be dismounted from the bottom wall with the gap being exposed for installation, removal or replacement of the cables or wires, in which the top wall has an inner margin which extends in overlapping relationship with the outer perimeter of the safetymat a sufficient amount for holding the outer perimeter of the safetymat against vertical movement when the top wall is mounted on the bottom wall.

3. A trim structure as in claim 2 which includes fastener means for fastening the base to the support, and the first interlock structure is comprised of a material which is sufficiently rigid to hold the safetymat against displacement relative to the support.

4. A trim structure as in claim 1 in which the second interlock structure is comprised of a material which is sufficiently resilient to enable the second releasable engagement member to yieldably disengage from the first releasable engagement member responsive to an upward component of force applied to the cover.

5. A trim structure as in claim 1 in which the first releasable engagement member comprises a catch on the first interlock structure, and the second releasable engagement member comprises a detent which projects laterally from the second interlock structure a sufficient amount to engage with the catch in the assembled mode.

6. A trim structure as in claim 1 which includes a laterally extending web member positioned in supporting relationship between the top and bottom walls for separating said portion of the top wall from said portion of the bottom wall.

* * * * *